United States Patent
Lizardo

(10) Patent No.: US 7,617,629 B2
(45) Date of Patent: Nov. 17, 2009

(54) EASY STEELIE HOOK

(76) Inventor: Roldan Orozco Lizardo, 1030 Randolph Dr., Yuba City, CA (US) 95991

( * ) Notice: Subject to any disclaimer, the term of this patent is extended or adjusted under 35 U.S.C. 154(b) by 0 days.

(21) Appl. No.: 11/707,680

(22) Filed: Feb. 17, 2007

(65) Prior Publication Data

US 2008/0196294 A1 Aug. 21, 2008

(51) Int. Cl.
*A01K 83/06* (2006.01)
*A01K 83/00* (2006.01)
(52) U.S. Cl. .................. 43/44.8; 43/43.16; 43/44.4; 43/44.83
(58) Field of Classification Search ............... 43/44.4, 43/44.2, 44.8, 44.6, 44.83, 43.16
See application file for complete search history.

(56) References Cited

U.S. PATENT DOCUMENTS

| | | | | |
|---|---|---|---|---|
| 615,170 A * | 11/1898 | Henckler | ............. | 43/44.4 |
| 745,066 A * | 11/1903 | Koch | ............. | 43/44.8 |
| 788,296 A * | 4/1905 | West | ............. | 43/44.4 |
| 797,162 A * | 8/1905 | West | ............. | 43/44.4 |
| 862,150 A * | 8/1907 | Fredricks | ............. | 43/44.4 |
| 911,040 A * | 2/1909 | Hickey | ............. | 43/44.8 |
| 914,478 A * | 3/1909 | Bradley et al. | ............. | 43/44.4 |
| 1,150,386 A * | 8/1915 | Rife | ............. | 43/44.8 |
| 1,258,213 A * | 3/1918 | Grothkopf | ............. | 43/44.8 |
| 1,601,292 A * | 2/1926 | Burns | ............. | 43/44.83 |
| 1,613,113 A * | 1/1927 | Leu | ............. | 43/44.4 |
| 2,143,054 A * | 1/1939 | Copeland | ............. | 43/44.4 |
| 2,222,554 A * | 11/1940 | Wirth et al. | ............. | 43/44.4 |
| 2,242,708 A * | 5/1941 | Lancaster | ............. | 43/43.16 |
| 2,272,332 A * | 2/1942 | Sisson | ............. | 43/44.83 |
| 2,333,503 A * | 11/1943 | Worden | ............. | 43/44.4 |
| 2,457,428 A * | 12/1948 | Worden | ............. | 43/44.83 |
| 2,503,573 A * | 4/1950 | Allen | ............. | 43/44.8 |
| 2,618,881 A * | 11/1952 | Gorrias | ............. | 43/43.16 |
| 2,697,295 A * | 12/1954 | Hinds | ............. | 43/44.8 |
| 2,700,843 A * | 2/1955 | Werner | ............. | 43/44.83 |
| 2,782,548 A * | 2/1957 | Linton | ............. | 43/44.83 |
| 2,815,603 A * | 12/1957 | Bandemer | ............. | 43/43.16 |
| 2,821,046 A * | 1/1958 | Fisk | ............. | 43/44.2 |
| 2,823,486 A * | 2/1958 | Behee | ............. | 43/44.83 |
| 2,828,573 A * | 4/1958 | Larsen | ............. | 43/44.2 |
| 2,870,563 A * | 1/1959 | Rose | ............. | 43/44.4 |
| 2,875,550 A * | 3/1959 | Pape | ............. | 43/44.2 |
| 2,888,772 A * | 6/1959 | Lawter | ............. | 43/44.8 |
| 2,926,454 A * | 3/1960 | Gottman | ............. | 43/44.83 |
| 2,962,834 A * | 12/1960 | Stinson | ............. | 43/44.8 |
| 2,982,049 A * | 5/1961 | Yost | ............. | 43/44.4 |
| 3,046,691 A * | 7/1962 | Courtright | ............. | 43/44.8 |
| 3,047,977 A * | 8/1962 | Der-Hagopian | ............. | 43/44.8 |

(Continued)

FOREIGN PATENT DOCUMENTS

DE 19944944 A1 * 4/2001

(Continued)

*Primary Examiner*—Darren W Ark
(74) *Attorney, Agent, or Firm*—The Affordable Patent Service; Ken Campbell

(57) ABSTRACT

This invention is a fishing device that is used in its preferred embodiment to trap bait between the hook and the line, within a boundary formed between the eyes. It eliminates the need for complicated knots, when using organic or otherwise fragile bait. It also prevents unnecessary damage to the bait during normal fishing activities.

1 Claim, 1 Drawing Sheet

U.S. PATENT DOCUMENTS

| | | | | |
|---|---|---|---|---|
| 3,193,965 A * | 7/1965 | Jacobsen | | 43/44.4 |
| 3,197,912 A * | 8/1965 | Kramer | | 43/44.4 |
| 3,368,299 A * | 2/1968 | Scheidt, Jr. | | 43/44.83 |
| 3,398,477 A * | 8/1968 | Paluzzi | | 43/44.4 |
| 3,604,143 A * | 9/1971 | Sauers | | 43/44.83 |
| 3,748,773 A * | 7/1973 | Goforth | | 43/44.4 |
| 3,778,920 A * | 12/1973 | Anton et al. | | 43/44.4 |
| 3,839,815 A * | 10/1974 | Latham | | 43/44.4 |
| 3,848,354 A * | 11/1974 | Austad et al. | | 43/44.83 |
| 3,863,383 A * | 2/1975 | Lore | | 43/44.8 |
| 3,936,971 A * | 2/1976 | McGahee | | 43/44.83 |
| 3,942,282 A * | 3/1976 | Flagel | | 43/44.2 |
| 4,163,339 A * | 8/1979 | Worden | | 43/44.4 |
| 4,229,901 A * | 10/1980 | Flowers et al. | | 43/44.4 |
| 4,232,470 A * | 11/1980 | Steffick, Jr. | | 43/43.16 |
| 4,294,031 A * | 10/1981 | Manno | | 43/43.16 |
| 4,307,532 A * | 12/1981 | Hughs | | 43/44.4 |
| 4,625,451 A * | 12/1986 | Griffiths | | 43/44.4 |
| 4,785,571 A * | 11/1988 | Beck | | 43/44.4 |
| 4,819,366 A * | 4/1989 | Manno | | 43/44.83 |
| 4,839,982 A * | 6/1989 | Wood | | 43/44.4 |
| 4,905,403 A * | 3/1990 | Manno | | 43/44.83 |
| 5,081,785 A * | 1/1992 | Kahng | | 43/44.83 |
| 5,083,394 A * | 1/1992 | Harwig | | 43/44.83 |
| 5,274,947 A * | 1/1994 | Griffiths | | 43/44.4 |
| 5,333,407 A * | 8/1994 | Merritt | | 43/44.4 |
| 5,339,559 A * | 8/1994 | Strobbe | | 43/44.8 |
| 5,386,661 A * | 2/1995 | Davis | | 43/44.8 |
| 5,617,668 A * | 4/1997 | Shimandle | | 43/44.8 |
| 5,881,491 A * | 3/1999 | Kira | | 43/44.83 |
| 6,038,806 A * | 3/2000 | Maitland | | 43/44.8 |
| 6,073,385 A * | 6/2000 | Sano | | 43/44.83 |
| 6,085,456 A * | 7/2000 | Battaglia | | 43/44.8 |
| 6,230,433 B1 * | 5/2001 | Nichols | | 43/44.4 |
| 6,247,260 B1 * | 6/2001 | Kandlbinder et al. | | 43/44.4 |
| 6,560,916 B1 * | 5/2003 | Maxim | | 43/44.83 |
| 6,560,917 B2 * | 5/2003 | Van Der Hoven et al. | | 43/43.16 |
| 6,637,148 B1 * | 10/2003 | Stallings | | 43/44.8 |
| D507,034 S * | 7/2005 | Robertson | | D22/144 |
| 7,412,796 B1 * | 8/2008 | Hart | | 43/44.83 |
| 7,481,019 B2 * | 1/2009 | Rosenberg | | 43/44.8 |
| 7,490,432 B2 * | 2/2009 | Gillihan | | 43/44.8 |
| 2003/0056425 A1 * | 3/2003 | Ivarson et al. | | 43/43.16 |
| 2003/0172579 A1 * | 9/2003 | Ivarson et al. | | 43/43.16 |
| 2004/0200127 A1 * | 10/2004 | Ivarson et al. | | 43/43.16 |
| 2004/0216362 A1 * | 11/2004 | Taylor | | 43/44.83 |
| 2004/0261312 A1 * | 12/2004 | Ravencroft | | 43/44.83 |
| 2005/0217167 A1 * | 10/2005 | Packard | | 43/44.83 |
| 2006/0096156 A1 * | 5/2006 | Griffero | | 43/44.8 |
| 2007/0119092 A1 * | 5/2007 | Gruber | | 43/44.83 |

FOREIGN PATENT DOCUMENTS

| | | | |
|---|---|---|---|
| DE | 10026293 A1 * | 12/2001 | |
| FR | 2591066 A1 * | 6/1987 | |
| FR | 2613907 A1 * | 10/1988 | |
| GB | 2185171 A * | 7/1987 | |
| GB | 2241419 A * | 9/1991 | |
| GB | 2350043 A * | 11/2000 | |
| GB | 2388289 A * | 11/2003 | |
| JP | 07203811 A * | 8/1995 | |
| JP | 09205935 A * | 8/1997 | |
| JP | 2001095427 A * | 4/2001 | |
| JP | 2004298168 A * | 10/2004 | |
| JP | 2006006303 A * | 1/2006 | |
| JP | 2006094843 A * | 4/2006 | |
| JP | 2006129858 A * | 5/2006 | |
| JP | 2006141381 A * | 6/2006 | |
| JP | 2006223199 A * | 8/2006 | |
| JP | 2006223288 A * | 8/2006 | |
| JP | 2007295829 A * | 11/2007 | |
| JP | 2008054653 A * | 3/2008 | |

* cited by examiner

EASY STEELIE HOOK

BACKGROUND

This invention relates to fishing. Many kinds of hooks have been devised for ease of tying to fishing line. Apparently, none have been designed with much of a concern for organic bait in mind. Piercing bait with the hook itself can damage fragile organic bait, enough so that it easily breaks off of the hook. For this reason, fishermen using organic bait, such as salmon roe, beef brain, liver, et cetera, have resorted to tying specialized loop knots. These knots form a slipping loop with the line, which is used to secure the bait to the straight portion of a common hook (known as the shank).

One popular example is known as the Oregon Loop Knot (also known as the Egg Loop or Bumper Knot). This knot constricts the bait with an almost circular loop of line, and pinches the bait against the shank of the hook. The loop knot is much more reliable than is simply piercing the bait with the hook.

However, this loop knot has two drawbacks. One is that the knot is relatively difficult to make, and requires a number of manipulation steps. The other drawback is that, because it constricts the bait to the shank, it can actually sever the bait from the shank when the line is under tension.

SUMMARY

The object of this invention is to provide a specialized hook that allows bait to be effectively captured by the rigid structure of the hook itself. Due to the unique configuration of this specialized hook, the line is used merely hold the bait captive. This arrangement ensures that the bait is reliably cradled in place, without being overly constricted by the line to the point of becoming damaged. Tying this specialized hook to a fishing line also requires only a simple knot of the user's choice. This can be a Clinch knot, an improved Clinch knot, a Palomar knot, et cetera.

One benefit is that the simple knot provides the effective utility of a more complicated loop knot, yet is much easier to tie on. Another benefit is that the bait is much less likely to be damaged, and broken away from the rig. A third benefit is the speed with which the hook may be tied to the line. All of these benefits increase the yield for subsistence fishermen, and sport fisherman alike.

In accordance with this invention, the device is a fishing hook having two eyelets that are both offset from the axis of the shank, and both offset to one and the same side. The formation of a pair of adjacent eyelets to a section of shank serves as a rigid boundary. This positively captures the bait along at least three sides. At the same time, the eyelets also serve to support a fishing line at a particular distance from the shank, itself. This practically eliminates the possibility that the bait will be severed by the line during normal fishing activity.

REFERENCE TO DRAWINGS

Drawing Figures

REFERENCE NUMERALS IN DRAWINGS

10 Hook
11 Point
20 Bend
30 Primary Eye
40 Shank
50 Secondary Eye
60 Line
70 Knot
80 Loop
90 Bait

DETAILED DESCRIPTION

Figure 1:
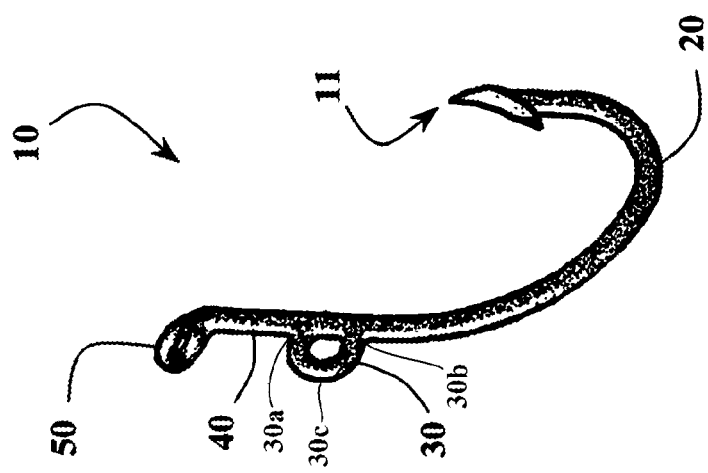
FIG. 1 shows the preferred embodiment of the invention, in perspective.

The preferred embodiment of the invention is shown in FIG. 1. This embodiment is a fishing hook 10 that consists of a point 11, a bend 20, a primary eye 30, a shank 40, and a secondary eye 50. The primary eye 30 and secondary eye 50 extend on the same side of the shank 40 which is opposite the side of the shank 40 on which the bend 20 and point 11 are positioned. The primary eye 30 comprises a first end portion 30a fixed to the shank 40, a second end portion 30b fixed to the shank 40, and wherein the first 30a and second 30b end portions extend away from the same side of the shank 40 and merge at an intermediate portion 30c to form the primary eye 30. The primary eye 30 extends in a plane extending generally parallel to a longitudinal axis of the shank 40 and secondary eye 50 extends in a plane which is at an obtuse angle to the longitudinal axis of the shank 40, the plane of the primary eye 30 intersecting the secondary eye 50, and the primary 30 and secondary 50 eyes are arranged such that the plane of the primary eye 30 and the plane of the secondary eye 50 are transverse to each other. The primary eye, the shank, and the secondary eye are arranged to form a cradle area. Within this cradle area, a piece of bait is intended to be held captive while being protected against severance from the hook.

Figure 2:
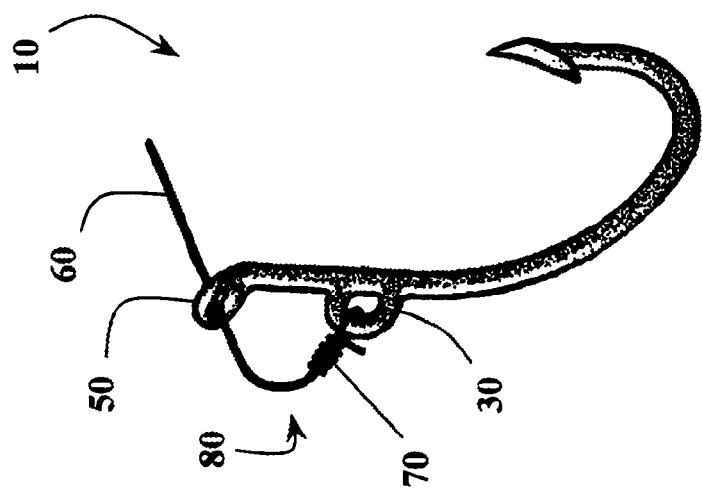
FIG. 2 shows the preferred embodiment of the invention, in perspective, with a line attached to it, using a simple knot, to form a mechanical loop.

FIG. 2 shows the preferred embodiment of the hook 10 with a portion of fishing line 60 tied to it. The primary eye 30 anchors a simple knot 70. From the knot, the line extends through the secondary eye 50 to effectively form a working, or mechanically slipping loop 80.

Figure 3:
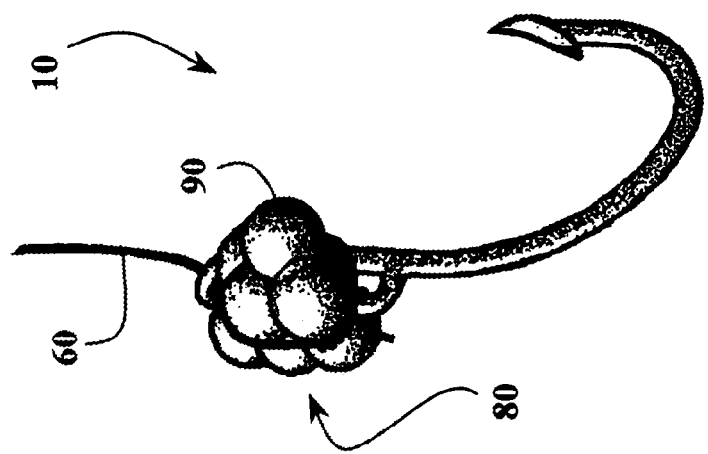
FIG. 3 shows the preferred embodiment of the invention, in perspective, carefully securing a piece of bait with a simple knot.

FIG. 3 shows the preferred embodiment of the hook 10 with the mechanical loop 80 assembled, with a piece of bait 90 secured in its appropriate position. Notice that, as any tension is applied to the line 60, the bait will remain in place.

In any embodiment of the invention, the distance between the primary eye and the secondary eye, along the shank, may vary to suit the particular needs of the intended user.

In this embodiment, the hook is made by molding or a suitable metal, or metal alloy. It can also be made of metal wire sections by bending, welding, brazing, and/or soldering, or of sheet metal by forging, stamping or laser cutting, and twisting, or any combination of the methods herein.

The invention claimed is:

1. A fishing hook in combination with a fishing line or leader, the fishing hook comprising a generally straight shank extending along a longitudinal axis, a point that terminates a distal end of said hook, a bend between said shank and said distal end of said hook, a secondary eye that terminates a proximal end of said hook, said shank being located between said proximal end of said hook and said bend, and a primary eye that is remote from both the distal and proximal ends of said hook, said primary eye being located on said shank, wherein said primary eye and said secondary eye are positioned at one side of said shank so as to form a cradle for accepting bait, said one side of said shank being opposite to an other side of said shank on which said bend and said point are positioned, wherein said primary eye has first and second end portions both fixed to and extending from said shank on said one side of said shank, said first end portion extending from said shank at a location between said secondary eye and said second end portion, said first and second end portions merging at an intermediate portion of said primary eye at a location spaced away from said shank to form said primary eye, wherein said primary eye extends in a first plane and said secondary eye extends in a second plane, said first plane extending generally parallel to said longitudinal axis of said shank, said second plane extending at an obtuse angle to said longitudinal axis of said shank, said first plane intersecting the secondary eye, and said primary and secondary eyes are arranged such that said first plane and said second plane are transverse to each other, and wherein said fishing line or leader is tied to said primary eye at a terminal end thereof while engaged to said hook by extending an intermediate portion of said fishing line or leader through said secondary eye, so as to form an effective slipping mechanical loop with said fishing line or leader.

* * * * *